(12) United States Patent
Allott et al.

(10) Patent No.: US 8,535,529 B2
(45) Date of Patent: Sep. 17, 2013

(54) CANISTER FILTER SYSTEM WITH DRAIN THAT COOPERATES WITH FILTER ELEMENT

(75) Inventors: Mark T. Allott, Mapleton, IL (US); David Ofori-Amoah, Chicago, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/235,332

(22) Filed: Sep. 16, 2011

(65) Prior Publication Data

US 2012/0000056 A1    Jan. 5, 2012

Related U.S. Application Data

(62) Division of application No. 11/873,489, filed on Oct. 17, 2007, now Pat. No. 8,157,997.

(51) Int. Cl.
*B01D 35/30* (2006.01)
*F02M 37/22* (2006.01)
*B01D 27/00* (2006.01)

(52) U.S. Cl.
USPC ........... 210/232; 210/248; 210/435; 210/440; 210/443; 210/450; 210/455; 210/493.2

(58) Field of Classification Search
None
See application file for complete search history.

(56) References Cited

U.S. PATENT DOCUMENTS

| | | |
|---|---|---|
| 2,621,796 A | 12/1952 | Wilkinson |
| 3,166,498 A | 1/1965 | Otto, Jr. |
| 3,224,591 A | 12/1965 | Sawyer |
| 3,369,666 A | 2/1968 | Hultgren et al. |
| 4,172,795 A | 10/1979 | Kurtz et al. |
| 4,298,465 A | 11/1981 | Druffel |
| 4,502,956 A | 3/1985 | Wilson et al. |
| 4,721,563 A | 1/1988 | Rosaen |
| 4,906,365 A | 3/1990 | Baumann et al. |
| 4,948,503 A | 8/1990 | Baumann et al. |
| 5,035,797 A | 7/1991 | Janik |
| 5,098,559 A | 3/1992 | Mack et al. |
| 5,203,994 A | 4/1993 | Janik |
| 5,300,223 A | 4/1994 | Wright |
| 5,302,284 A | 4/1994 | Zeiner et al. |
| 5,312,546 A | 5/1994 | Janik |
| 5,342,519 A | 8/1994 | Friedmann et al. |
| 5,366,400 A | 11/1994 | Kucik |
| 5,374,355 A | 12/1994 | Habiger et al. |
| 5,458,767 A | 10/1995 | Stone |

(Continued)

FOREIGN PATENT DOCUMENTS

| | | |
|---|---|---|
| DE | 1933283 | 1/1971 |
| DE | 4124322 | 1/1993 |

(Continued)

OTHER PUBLICATIONS

English Abstract for DE-4124322 A1 from esp@cenet database (1 page), 1993.

(Continued)

*Primary Examiner* — Benjamin Kurtz
(74) *Attorney, Agent, or Firm* — Finnegan, Henderson, Farabow, Garrett & Dunner LLP

(57) ABSTRACT

A filter assembly with a replaceable filter element and a reusable filter housing, which incorporates a locking mechanism to ensure that the filter system will not be operated without a filter element installed.

19 Claims, 3 Drawing Sheets

(56) References Cited

U.S. PATENT DOCUMENTS

| | | | |
|---|---|---|---|
| 5,474,676 | A | 12/1995 | Janik et al. |
| 5,484,527 | A | 1/1996 | Janik et al. |
| 5,489,384 | A | 2/1996 | Janik et al. |
| 5,525,225 | A | 6/1996 | Janik et al. |
| 5,538,626 | A | 7/1996 | Baumann |
| 5,548,893 | A | 8/1996 | Koelfgen |
| 5,578,221 | A | 11/1996 | Janik |
| 5,584,987 | A | 12/1996 | Mules |
| 5,660,726 | A | 8/1997 | Dluzik |
| 5,660,729 | A | 8/1997 | Baumann |
| 5,660,771 | A | 8/1997 | Dunfee et al. |
| 5,685,985 | A | 11/1997 | Brown et al. |
| 5,688,396 | A | 11/1997 | Baumann et al. |
| 5,695,633 | A | 12/1997 | Ernst et al. |
| 5,698,098 | A | 12/1997 | Ernst et al. |
| 5,702,602 | A | 12/1997 | Brown et al. |
| 5,718,825 | A | 2/1998 | Greive et al. |
| 5,738,785 | A | 4/1998 | van Heiningen |
| 5,753,116 | A | 5/1998 | Baumann et al. |
| 5,753,120 | A | 5/1998 | Clausen et al. |
| 5,770,054 | A | 6/1998 | Ardes |
| 5,770,065 | A | 6/1998 | Popoff et al. |
| 5,772,881 | A | 6/1998 | Stockhowe et al. |
| 5,779,903 | A | 7/1998 | Smith et al. |
| 5,785,850 | A | 7/1998 | Lynch et al. |
| 5,817,232 | A | 10/1998 | Roll et al. |
| 5,858,227 | A | 1/1999 | Stone et al. |
| 5,888,383 | A | 3/1999 | Cox |
| 5,904,844 | A | 5/1999 | Stone |
| 5,922,196 | A | 7/1999 | Baumann |
| 5,922,199 | A | 7/1999 | Hodgkins |
| 5,928,511 | A | 7/1999 | Messner et al. |
| 5,935,481 | A | 8/1999 | Dunfee et al. |
| 5,972,210 | A | 10/1999 | Munkel |
| 6,015,492 | A | 1/2000 | Popoff et al. |
| 6,016,923 | A | 1/2000 | Baumann |
| 6,045,693 | A | 4/2000 | Miller et al. |
| 6,058,899 | A | 5/2000 | Schetter |
| 6,068,762 | A | 5/2000 | Stone et al. |
| 6,090,283 | A | 7/2000 | Schumann et al. |
| 6,113,781 | A | 9/2000 | Popoff et al. |
| 6,173,859 | B1 | 1/2001 | Schumann et al. |
| 6,174,438 | B1 | 1/2001 | Hodgkins et al. |
| 6,177,003 | B1 | 1/2001 | Jainek et al. |
| 6,187,191 | B1 | 2/2001 | Koivula et al. |
| 6,224,758 | B1 | 5/2001 | Jainek et al. |
| 6,227,381 | B1 | 5/2001 | Koivula |
| 6,248,236 | B1 | 6/2001 | Hodgkins |
| 6,322,697 | B1 | 11/2001 | Hacker et al. |
| 6,471,070 | B2 | 10/2002 | Janik |
| 6,485,637 | B2 | 11/2002 | Janik et al. |
| 6,506,302 | B2 | 1/2003 | Janik |
| 6,514,404 | B1 | 2/2003 | Bauer |
| 6,517,710 | B2 | 2/2003 | Hartmann et al. |
| 6,554,140 | B2 | 4/2003 | Steger, Jr. et al. |
| 6,569,326 | B1 | 5/2003 | Baumann et al. |
| 6,579,448 | B2 | 6/2003 | Dworatzek |
| 6,591,807 | B1 | 7/2003 | Ardes |
| 6,605,210 | B2 | 8/2003 | Reinhardt |
| 6,607,665 | B2 | 8/2003 | Fick et al. |
| 6,610,203 | B1 | 8/2003 | Jainek |
| 6,626,299 | B1 | 9/2003 | Brown et al. |
| 6,685,829 | B1 | 2/2004 | Baumann et al. |
| 6,709,588 | B2 | 3/2004 | Pavlin et al. |
| 6,729,477 | B2 | 5/2004 | Yates |
| 6,740,234 | B1 | 5/2004 | Williams et al. |
| 6,972,092 | B1 * | 12/2005 | Roll ............................ 210/313 |
| 6,974,539 | B1 | 12/2005 | McKenzie |
| 2002/0158006 | A1 | 10/2002 | Thomas |
| 2003/0098269 | A1 | 5/2003 | Ardes |
| 2003/0226790 | A1 | 12/2003 | Brown et al. |
| 2003/0226800 | A1 | 12/2003 | Brown et al. |
| 2006/0091064 | A1 | 5/2006 | Brown et al. |
| 2006/0096934 | A1 | 5/2006 | Weinberger et al. |
| 2006/0118476 | A1 | 6/2006 | Weindorf et al. |
| 2007/0181481 | A1 | 8/2007 | Reynolds et al. |
| 2008/0308481 | A1 | 12/2008 | Wieczorek et al. |
| 2010/0032359 | A1 | 2/2010 | Gillenberg et al. |
| 2010/0170842 | A1 | 7/2010 | Knickmann et al. |
| 2012/0000841 | A1 | 1/2012 | Allott et al. |

FOREIGN PATENT DOCUMENTS

| | | | |
|---|---|---|---|
| DE | 202008013578 | | 3/2009 |
| EP | 0844012 | | 5/1998 |
| EP | 1009512 | | 6/2000 |
| EP | 2107928 | | 5/2010 |
| FR | 2762230 | | 10/1998 |
| JP | 57-112071 | | 7/1982 |
| JP | 57112071 | | 7/1982 |
| JP | 7-10407 | | 2/1995 |
| JP | 710407 | | 2/1995 |
| JP | 09173716 | | 7/1997 |
| JP | 09173716 | | 8/1997 |
| JP | 11-104408 | * | 4/1999 |
| JP | 11104408 | | 4/1999 |
| WO | WO2007/094978 | | 8/2007 |
| WO | WO2008157597 | | 12/2008 |

OTHER PUBLICATIONS

English Abstract for FR2762230 from esp@cenet database (1 page), 1998.

Illustration of Fluid Filter (1 page), 2007.

Specification Data Sheet for Baldwin Filters, 2004 (2 pages).

Office Action mailed Apr. 26, 2012, in Russian Patent Application No. 2010119507.

EPO Examination Report dated Feb. 26, 2010 in European Patent Application No. 08 839 211.3.

EPO Examination Report dated May 11, 2010 in European Patent Application No. 08 839 211.3.

EPO Examination Report dated Apr. 27, 2012 in European Patent Application No. 08 839 211.3.

Office Action dated Mar. 24, 2011 in Chinese Patent Application No. 200880010539.8.

Office Action dated Jun. 13, 2012 in Chinese Patent Application No. 200880010539.8.

Office Action mailed Sep. 5, 2012 in U.S. Appl. No. 12/896,555.

Final Office Action mailed Dec. 7, 2012 in U.S. Appl. No. 13/235,306.

Notice of Allowance mailed Nov. 9, 2012 in Japanese Patent Application No. 2010-529915.

Office Action mailed Sep. 7, 2012 in Japanese Patent Application No. 2010-529915.

Official Notice of Rejection mailed May 11, 2012 in Japanese Patent Application No. 2010-529915.

* cited by examiner

CANISTER FILTER SYSTEM WITH DRAIN THAT COOPERATES WITH FILTER ELEMENT

This application is a divisional of U.S. application Ser. No. 11/873,489, filed Oct. 17, 2007, now U.S. Pat. No. 8,157,997 which is incorporated herein by reference.

TECHNICAL FIELD

The field of this disclosure is filter systems. More specifically, the field is canister filter systems for liquids, such as lube oil or liquid fuels, which have drains for draining liquid out of the canister.

BACKGROUND

Canister filter systems are used extensively today on equipment such as internal combustion engines, construction and mining machinery, and many other types of industrial machinery. They are used to filter contaminants from fluids in fuel systems, lubrication oil systems, hydraulic fluid power systems, hydraulic fluid control systems, transmission fluid systems, engine air intake systems, and the like.

A canister filter system typically includes a base which is often attached to the equipment, a canister (also sometimes called a housing, cup, can, or cover), and a filter element which is removably positioned inside the canister. After the filter element is positioned inside the canister, the canister is attached to the base with threads or other attachment means to form a sealed compartment around the filter element. The canister, base, and filter element cooperate to define fluid pathways through which fluid is directed through the filter element. The filter element contains filter media which traps and collects contaminants as the fluid passes through it. The trapped contaminants may include dirt, water, soot, ash, metallic particles, and other harmful debris.

Eventually these contaminants clog the filter media and reduce its effectiveness. Or other conditions can develop over time which also reduce the effectiveness of the filter media in removing contaminants. When this occurs, the filter element should be replaced (or possibly cleaned, but this is impractical for most applications). But only the filter element needs to be replaced, while the canister, base, and other components are reused. The filter element is designed to be conveniently replaced and readily disposed. The filter element can be replaced on demand, i.e. when the filter becomes clogged and requires replacement, or periodically, according to the guidance of a periodic maintenance schedule established for the particular application.

Canister filter systems can have many advantages over other filter systems such as spin-on filters. For instance, canister filter systems can be relatively inexpensively provided with a drain. To avoid spills, a technician may wish to remove the fluid from the canister in a controlled and contained manner before detaching the canister to replace the filter element. The drain facilitates the removal of fluid that is inside the canister. In some circumstances the fluid can spill if it is not first removed from the canister before detaching the canister from the base. The drain is typically integrated into the canister. Because in a canister filter system the drain generally increases just the cost of the canister, which is reused and purchased only once, and generally does not increase the cost of the filter element, which is frequently replaced and purchased many times, the additional cost of including a drain does not significantly increase the total operating cost to the equipment owner.

U.S. Pat. No. 6,814,243, granted Nov. 9, 2004, ("the '243 patent") is an example of prior art canister filter systems incorporating a drain in the canister. FIG. 1 of the '243 patent illustrates a canister 14 with an integrated drain (the drain is not labeled with a reference character, but is shown incorporated into the bottom of canister 14 in FIG. 1, and is shown in a closed position).

The '243 patent is also an example of another, increasingly important feature of canister filter systems. The arrangement of the filter system described in the '243 patent makes it impossible to install the canister to the base, without first having a filter element properly installed in the canister. This prevents, for example, accidentally or intentionally running the machinery without the filter element in place. As components such as fuel pumps, fuel injectors, hydraulic pumps, valves, bearings, engines, etc., become more expensive, more high tech, and are made with tighter tolerances and specifications, it is increasingly important to protect these components against contamination. Contamination may cause premature wear and even failure, and the problem is compounded when the component has tight tolerances between parts or is very expensive. Thus, it may be very advantageous in some applications to ensure that a technician does not accidentally or intentionally try to run machinery without an appropriate filter element in place.

However, while the filter system of the '243 patent performs well in some applications, it may suffer from several disadvantages, or is otherwise not well suited for other applications. For instance, the filter system of the '243 patent may not be well suited for applications where the fluid in the canister is at a high pressure. Because the connection of the canister to the base is through the filter element, the force of high pressure in the canister is reacted through the filter element, which may not be strong enough for the pressures of some applications. Additionally, O-ring between the canister and base is not intended to hold high pressure inside of the canister.

The presence of threads in the filter element's center tube can be a disadvantage in some circumstances. The threads in the center tube, which are used to connect the filter element and canister to the base, are located in the clean fluid pathway out of the system. Threads in the clean fluid pathway may contribute to contamination.

In addition, the canister of the system described in the '243 patent can be relatively complicated and expensive to manufacture for some applications. The connection structure incorporated into the bottom of the canister may add too much cost for some applications.

Because of these drawbacks, another canister filter design is needed which still prevents accidentally or intentionally using the filter system without a filter element installed, but is also relieved of some or all of the disadvantages exhibited by the '243 patent.

SUMMARY

A canister filter system includes a base, a canister attachable to the base, and a filter element having filter media positioned inside the canister. A drain forms a seal with, and may releasably engage the filter element when the drain is in a closed position. In an open position, the drain allows fluid to be removed from the canister. Because the drain forms a seal with, and may releasably engage the filter element in the closed position, the drain cannot be closed unless a filter element is properly positioned inside the canister. This prevents accidental or intentional use of the filter system without a filter element in place.

DETAILED DESCRIPTION

Figure 1:
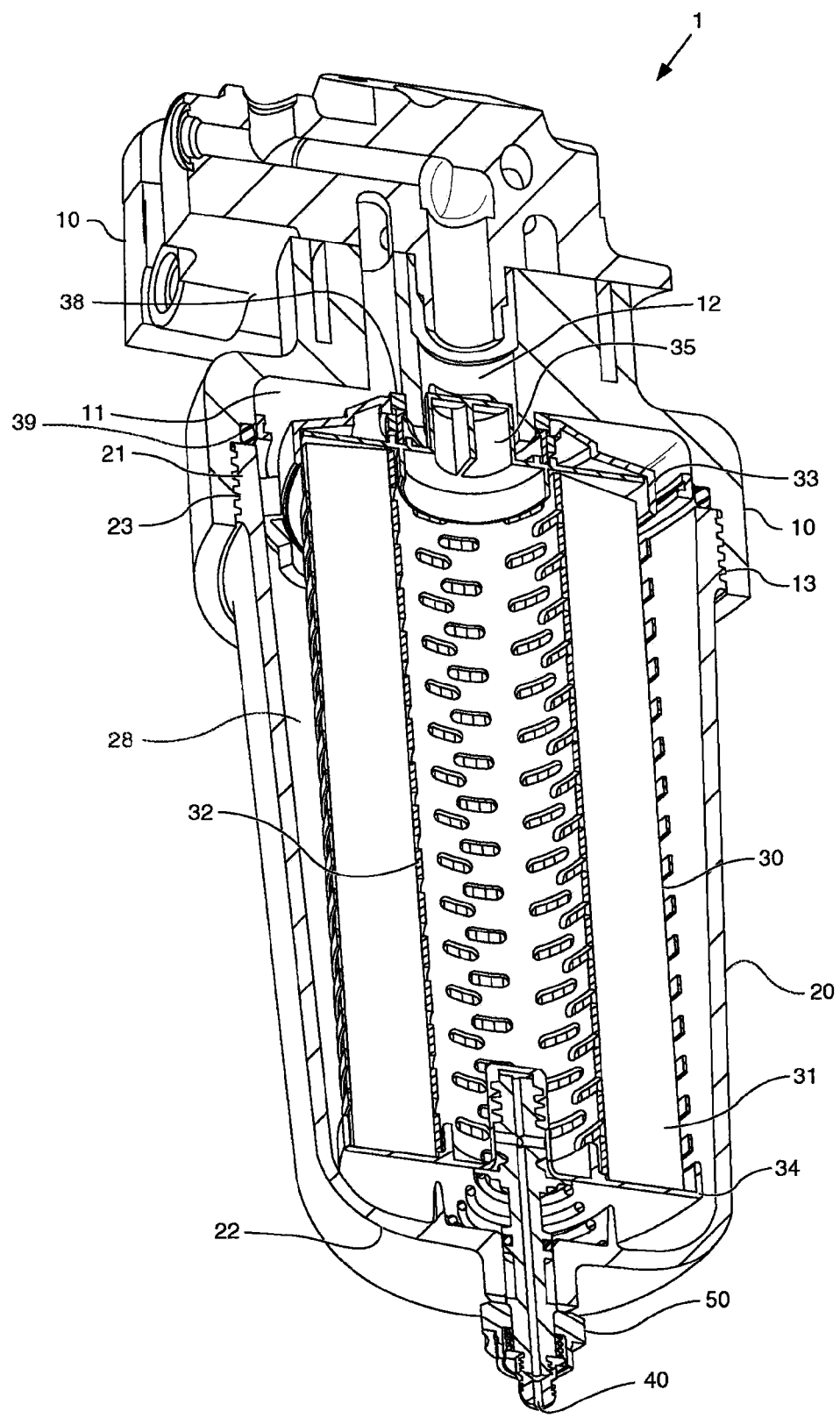
FIG. 1 is a cut away view of a canister filter system, including a base, a canister, and filter element.

The following is a detailed description of exemplary embodiments of the invention. The exemplary embodiments described herein and illustrated in the drawing figures are intended to teach the principles of the invention, enabling those of ordinary skill in this art to make and use the invention in many different environments and for many different applications. The exemplary embodiments should not be considered as a limiting description of the scope of patent protection. The scope of patent protection shall be defined by the appended claims, and is intended to be broader than the specific embodiments described herein.

FIG. 1 illustrates a canister filter system 1 having a base 10, a canister 20, and a filter element 30. The general construction and use of a canister filter system is understood by those of ordinary skill in this art. Thus, all the details of the construction and use of canister filter system 1 need not be explained here. The canister filter system 1 may be used to filter fluids such as diesel or gasoline or other liquid fuels, lubrication oil, hydraulic fluid for hydraulic power systems, transmission fluid, or even possibly intake air for an engine. The canister filter system 1 may also be used as a fuel/water separator filter. The canister filter system 1 with the features described herein could be adapted by those of ordinary skill in this art to serve many different purposes and suit many other applications.

The base 10 includes an inlet channel 11 for fluid inlet into the canister filter system 1, and an outlet channel 12 for fluid outlet from the canister filter system 1. The base also includes base threads 13.

The canister 20 includes an open end 21 and a closed end 22. Adjacent the open end 21 are canister threads 23 which can be engaged with base threads 13 to hold the canister 20 to base 10. Threads are one example of engagement structures which may be included on the base 10 and canister 20 to form a releasable engagement. Other engagement structures may be used as will be recognized by those of ordinary skill in this art.

The filter element 30 may take many different forms to suit a particular application. In the illustrated embodiment, the filter element 30 is well suited for filtering fuel or lubrication oil. The filter element 30 may include annularly arranged filter media 31 circumferentially surrounding a central reservoir defined by center tube 32. Axial ends of filter media 31 are sealed by end plates. Open end plate 33 defines an axial open end of filter element 30. The open end plate 33 is termed "open" because it includes an opening 35 for allowing passage of fluid to outlet channel 12 from the central reservoir defined by center tube 32. Closed end plate 34 defines an axial closed end of filter element 30. The closed end plate 34 is termed "closed" because it prevents any fluid outside the filter element 30 adjacent axial end of filter media 31 from flowing unfiltered into center tube 32. Open end plate 33 and closed end plate 34 may each be joined to the center tube 32 via welding, adhesives, etc. Alternatively, several or all of center tube 32, open end plate 33, and closed end plate 34 may be constructed as unitary components.

Fluid to be filtered enters from the inlet channel 11 and flows to the annular cavity 28 between canister 20 and filter media 31. The fluid then passes into and through filter media 31, then into center tube 32 through the perforations shown therein in FIG. 1. The fluid exits center tube 32 through open end plate 33 and opening 35 into the outlet channel 12. The open end plate 33 and closed end plate 34 help define the fluid channels into and out of filter media 31, preventing any fluid from flowing directly to outlet channel 12 and bypassing filter media 31. First and second annular seals 38 and 39 may advantageously be included on filter element 30 and also help define and seal fluid passageways into and out of filter element 30. First annular seal 38 may be included on the open end plate 33 around opening 35 and adjacent the axial open end of filter element 30 to help seal the inlet channel 11 from the outlet channel 12. Second annular seal 39, larger in diameter than first annular seal 38, may be formed circumferentially around the open end plate 33 to provide the seal between canister 20 and base 10, or in other words provides a seal to prevent fluid in inlet channel 11 from leaking out of the joint between canister 20 and base 10. First and second annular seals 38, 39 may be integrally formed with open end plate 33, or attached with adhesives or other methods, as is known in this art. When first and second annular seals 38, 39 are integrally formed on or included on open end plate 33, proper replacement of these seals is assured when the filter element is replaced at proper intervals. Otherwise, a technician may fail to properly replace the seals at appropriate intervals, which could result in leakage out of the system, or leakage within the system allowing unfiltered fluid to bypass the filter element 31 and lead to contamination.

Figure 2:
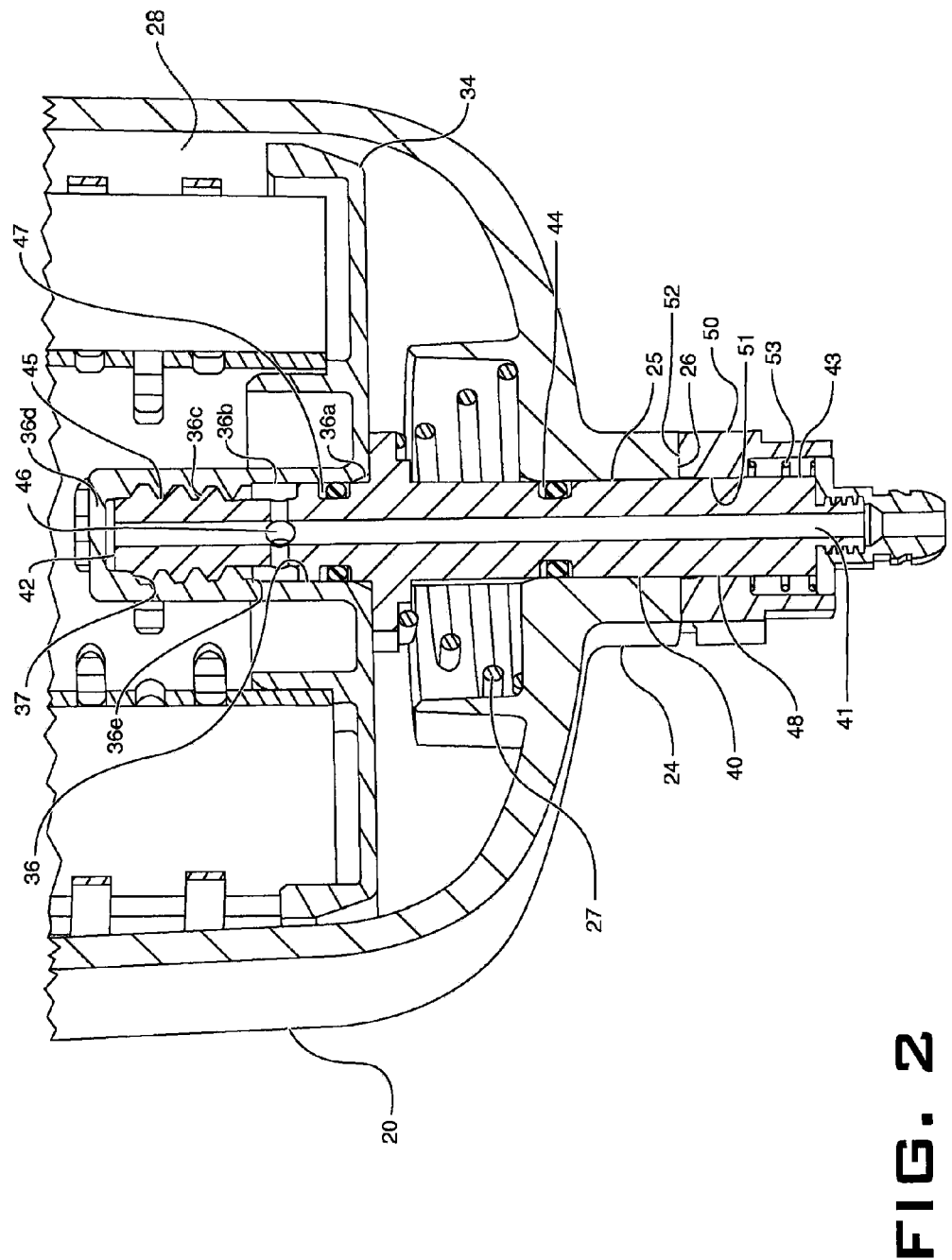
FIG. 2 is a detailed view from FIG. 1 with the drain 40 in a closed position.
Figure 3:
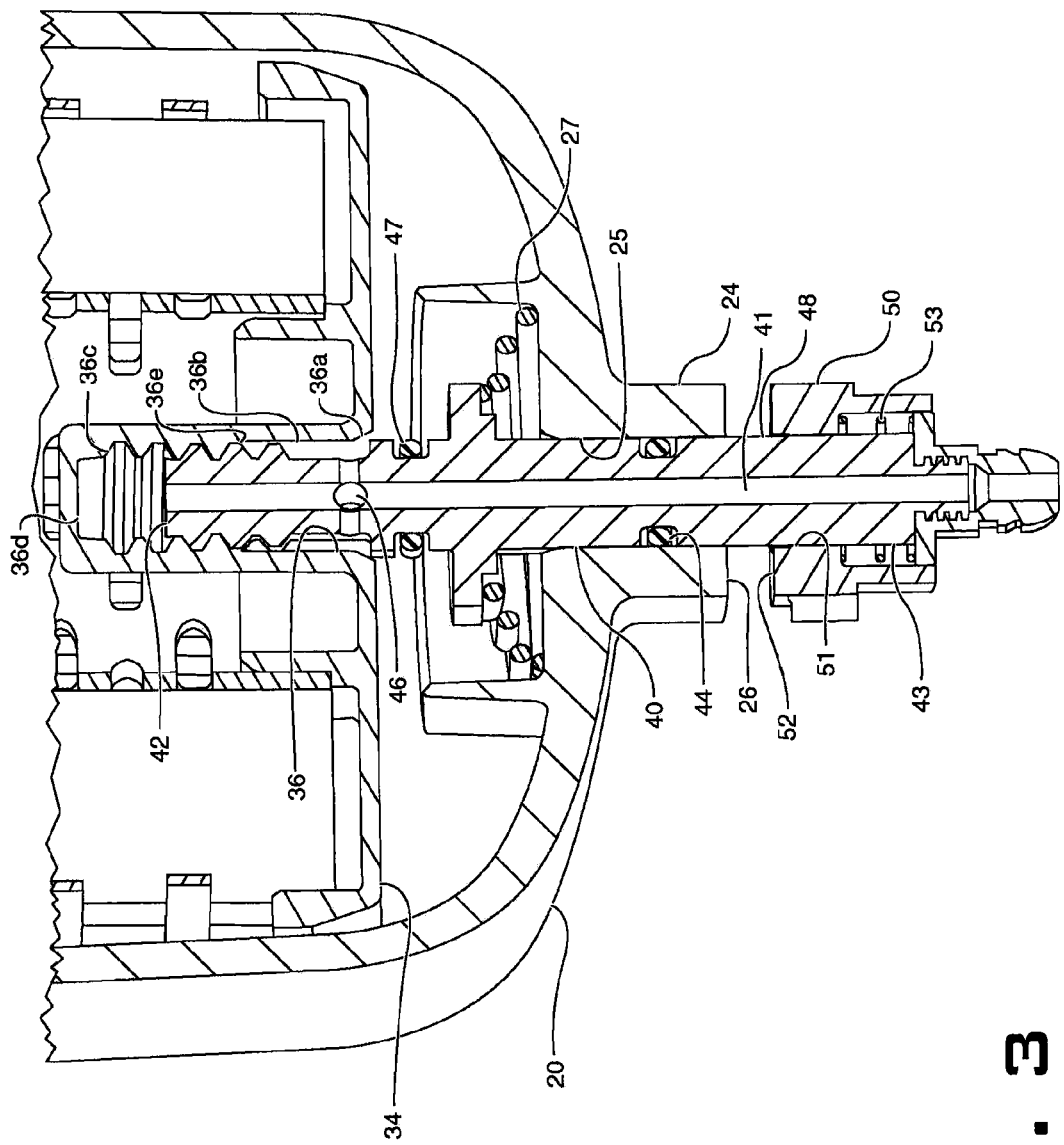
FIG. 3 is a detailed view from FIG. 1 with the drain 40 in an open position.

With reference now to FIGS. 2 and 3, a drain 40 penetrates the closed end 22 of canister 20. The drain 40 provides a drain channel 41 for removing fluid from inside of canister 20. The drain 40 is elongated and includes an inlet end 42 and an outlet end 43 connected to one another by the drain channel 41. Inlet end 42 is positioned inside of canister 20. Outlet end 43 is positioned outside of canister 20. The drain 40 may be moved between a closed position and an open position. In the closed position of FIG. 2, fluid is not able to flow through drain channel 41. In the open position of FIG. 3, fluid is able to flow from the inlet end 42, through drain channel 41, and out from outlet end 43. Drain 40 can be adapted to suit many different applications. The illustrated embodiment provides only one exemplary configuration for drain 40.

Canister 20 includes a drain boss 24 on closed end 22. Drain boss 24 protrudes out and away from closed end 22, and may include surfaces thereon that would allow a tool, such as an adjustable, open-ended wrench, to engage the drain boss 24 and turn the canister 20. Drain boss 24 forms a bore 25. Drain 40 is positioned in, and is able to slide axially and rotate in bore 25. An O-ring groove 44 is formed around the exterior of drain 40 and an O-ring is positioned therein. Alternatively, the O-ring groove may be formed on the bore 25. The O-ring prevents fluid leakage out of canister 20 through bore 25 from between drain 40 and drain boss 24.

Drain 40 may cooperate with filter element 30 to form a releasable engagement with filter element 30, and a releasable seal with filter element 30, when drain 40 is in its closed position. In the illustrated embodiment, drain 40 forms a releasable engagement with filter element 30 through engagement structure that includes a releasable threaded connection. Closed end plate 34 may form a pocket 36 in which are provided threads 37. Threads 37 are formed on an inside surface of the pocket 36. Mutual threads 45 may be formed near inlet end 42 of drain 40. Drain 40 may be engaged with filter element 30 by threading together threads 37 and 45. Threads are one example of engagement structures which may be included on the filter element 30 and drain 40 to form a releasable engagement. Other known engagement structures may be used for particular advantage in certain applications as will be recognized by those of ordinary skill in this art.

When in its closed position, with drain 40 releasably engaged with filter element 30, a releasable seal is made with filter element 30 so that practically no fluid can enter inlet end 42 of drain 40. The releasable seal is made with seal structure which, in the illustrated embodiment, includes an inlet opening 46 extending between drain channel 41 and the radial exterior of inlet end 42, and pocket 36 which receives the inlet opening 41 when the drain 40 is sealed. Putting drain 40 in its closed position moves inlet opening 46 inside of pocket 36, blocking the inlet opening 46 so that practically no fluid can enter therein. Additionally, an O-ring groove 47 may be formed on drain 40 and an O-ring positioned therein. This O-ring may provide additional protection against fluid leaking from between drain 40 and pocket 36 and entering inlet opening 46. Instead of positioning the O-ring inside of pocket 36, the O-ring could also be positioned between drain 40 and another portion of closed end plate 34, and the O-ring could be positioned in a groove formed on closed end plate 33 instead of on drain 40. When moving drain 40 to its closed position, as it advances into pocket 36, fluid trapped therein may need an escape path. This path may be provided by allowing drain channel 41 to be open through axial inlet end 42 of drain 40.

Pocket 36 includes an open end 36a, a smooth section 36b, a threaded section 36c, and a closed end 36d. Closed end 36d ensures that no fluid may flow from center tube 32 into pocket 36 and inlet opening 46, and vice versa. Threads 37 are formed in the threaded section 36c. Smooth section 36b may act as a part of the sealing structure by fitting tightly against the surfaces of drain 40 to prevent fluid from entering between and flowing from open end 36a to inlet opening 46. Smooth section 36b may also provide a surface against which the O-ring in O-ring groove 47 may seal for additional protection against fluid passage. To help maintain the smoothness of the surface of smooth section 36b, the diameter of this section may be larger than the major diameter of the threads 37, forming a lip 36e between the smooth section 36b and threaded section 36c. The larger diameter of smooth section 36b will help avoid the threads 45 on drain 40 from degrading the smooth surface used for sealing purposes.

When in an opened position, drain 40 is at least partially disengaged from filter element 30, and inlet opening 46 is open so that fluid may flow into drain channel 41. In the illustrated embodiment with a threaded engagement, putting the drain 40 in an opened position requires turning drain 40 to disengage threads 37 and 45. As threads 37 and 45 disengage, inlet end 42 of drain 40 advances out of pocket 36, unblocking inlet opening 46. Together, these features ensure that no fluid may enter inlet end 42 of drain 40 except when inlet opening 46 has backed out of pocket 36, clearing the smooth section 36b and the open end 36a. Fluid is then free to flow from inside canister 20, through inlet opening 46, through drain channel 41, and exit through outlet end 43 of drain 40.

Threads 37 and pocket 36 on filter element 30 need not necessarily be formed in closed end plate 34. The threads 37 and pocket 36 could also be formed as part of center tube 32, or some other part of filter element 30, as will be understood by those of ordinary skill in this art.

Other features and constructions may be used to provide cooperation between drain 40 and filter element 30 so that fluid cannot flow through drain 40 when drain 40 is in the closed position, and fluid may flow through drain 40 when drain 40 is in the opened position. For example, filter element 30 and drain 40 could be constructed so that drain 40 makes a releasable seal with filter element 30 to close drain 40, but the two may not be releasably engaged. Instead, as an example, the filter element 30 and drain could be independently engaged with the canister 20, and moving drain 40 to a closed position would involve drain 40 moving upward to form a releasable seal with filter element 30, but not releasably engage it.

The releasable engagement and the releasable seal between the drain 40 and the filter element 30 has several advantages. First, the engagement and/or seal ensure that a filter element 30 is placed inside canister 20 before the system can be used. A technician will not accidentally or intentionally assemble the system without a filter element 30 because without it, the drain 40 cannot be closed. Ensuring the presence of filter element 30 helps ensure that the fluid will be properly filtered.

With no threaded connections in the pathway of clean fluid from the center tube 32 to the outlet channel 12, the possibility of contamination is reduced. Threaded connections in the clean, filtered fluid pathway have been identified as a potential source of contamination. When threads are cut or formed in other ways on a metal component, or even a plastic component, a small amount of debris is often left on the threads. When the threaded connection is made, the debris may be removed through the threading action, and is then free to enter the clean fluid pathway and result in contamination of downstream components. Thus, the avoidance of threads in the clean fluid pathway eliminates this potential source of contamination.

The provision of threads on the filter element 30 provides a convenient means for repairing the threaded connection should the threads be crossed or damaged in some manner. If a threaded connection is between the canister 20 and drain 40 (as in prior art systems), either the canister 20 or the drain 40, or both, must be replaced if the threads are crossed or damaged in some other way. If threads 37 formed on filter element 30 are formed in plastic, while threads 45 on the drain 40 are formed in a harder material (possibly aluminum or another metal), when threads 37 and 45 are crossed, more than likely only threads 37 will be damaged. Threads 37 are easily replaceable by replacing the filter element 30. Finally, the engagement between the drain 40 and filter element 30 provides a means for securely holding the filter element inside the canister 20.

Holding the filter element 30 inside of canister 20 may have some advantages during installation and replacement of the filter element 30. For example, the canister 20 can be turned upside down by a technician to drain residual fluid therefrom, without the filter element 30 falling out. Also, the filter element 30 can be held in the correct position inside of canister 20 so that when the canister 20 is attached to the base 10, the filter element 30 will properly align with features on the base 10.

Other advantages may also be realized in some applications. In some applications, the manufacturing of canister 20 may be simplified because no structure for engaging the drain (e.g. threads) is needed on the canister.

Drain knob 50 facilitates turning drain 40 for moving between its closed and open positions. Drain knob 50 may be optionally positioned about drain 40 on the exterior of canister 20. Drain knob 50 includes splines 51 that mate with splines 48 formed on the exterior of drain 40. The splines 51, 48 allow drain knob 50 to move axially relative to drain 40 (along an axis parallel to the rotational axis of drain 40), but tie the two together rotationally. Turning drain knob 50 will cause a corresponding rotation of drain 40.

In addition, drain knob 50 includes camming surfaces 52 that engage with mutual camming surfaces 26 on drain boss 24. A spring 53 acts between the drain 40 and the drain knob 50, biasing the camming surfaces 52 towards engagement with the camming surfaces 26. When camming surfaces 52 and 26 engage one another, they permit the drain knob 50 to rotate relative the canister 20 in only a single direction. Camming surfaces 52 and 26 may be formed to permit rotation of drain knob 50 and drain 40 in the direction of its closed position (clockwise in the illustrated embodiment), but prohibit drain 40 to rotate in the opposite direction towards its open position unless camming surfaces 52 and 26 are disengaged. They may be disengaged by pulling drain knob 50 against the bias of spring 53, and separating the two camming surfaces 52, 26. The camming surfaces 52, 26 permit relative rotation in one direction by providing cams whereby the cams may slide by one another in one direction. The camming surfaces 52, 26 prohibit relative rotation in the other direction by providing positive stopping surfaces which interfere or clash.

A spring 27 may optionally act between drain 40 and canister 20. Spring 27 biases the drain 40 into the canister 20. This may provide advantages in inserting and removing the filter element 30. For instance, in cooperation with the drain knob 50, biasing the drain 40 upwards causes the camming surfaces 52, 26 to engage and temporarily block rotation of the drain 40 in one direction. With spring 27 positioned as shown in the figures, and with camming surfaces 52 and 26, a technician can install a replacement filter element 30 in a simple manner by holding the canister 20 with one hand, and turning the filter element 30 with the other hand to engage the filter element 30 with the drain 40.

The canister filter system 1 may be assembled by first positioning the filter element 30 inside the canister 20. The canister 20 includes an open end 21 through which the filter element 30 may pass, and a closed end 22. Next the drain 40 is caused to engage the filter element 30. The drain 40 passes through the bore 25 in the canister 20, with the inlet end 42 projecting into the canister to engage with the filter element 30. Preferably, the filter element 30 and drain 40 are first fully engaged, which simultaneously moves the drain to a closed position, before the canister 20 is finally engaged with the base 10 to complete the assembly.

With first and second annular seals 38 and 39 (see FIG. 1) integrally formed with or attached to filter element 30, many of the surfaces and seals which provide a sealing function in the system 1 will be replaced when the filter element 30 is replaced. This helps ensure the system 1 will function properly throughout its life.

Industrial Applicability

The canister filter system 1 may be used to filter contaminants from fluid systems including fuel systems, lubrication oil systems, hydraulic fluid power systems, hydraulic fluid control systems, transmission fluid systems, engine air intake systems, and the like, while permitting fluid to be conveniently drained using drain 40. Because of the arrangement of drain 40 with filter element 30, a technician is prevented from accidentally or intentionally operating system 1 unless a filter element 30 is in place. This operability limitation helps protect components which are sensitive to contamination.

We claim:

1. A method of assembling filter components, the method comprising:
    supporting annular filter media of a filter element around a central reservoir with an axial open end of the filter element at a first end of the central reservoir and an axial closed end of the filter element at a second end of the central reservoir, the axial open end having an opening allowing fluid to flow from the central reservoir to the outside of the filter element, and the axial closed end having a configuration preventing fluid from passing into or out of the central reservoir through the axial closed end;
    engaging a drain to a pocket of the filter element formed adjacent the axial closed end, including
        inserting a threaded portion of the drain into an open end of the pocket, wherein the open end of the pocket is formed by the axial closed end of the filter element adjacent the second end of the central reservoir,
        moving the threaded portion of the drain inside a closed sidewall of the pocket that extends from the open end of the pocket to a closed end of the pocket, wherein moving the threaded portion of the drain inside the closed sidewall includes
            moving the threaded portion of the drain within a smooth section of the closed sidewall toward the closed end of the pocket, and
            threading the threaded portion of the drain to a threaded section of the closed sidewall that is disposed farther from the open end of the pocket than the smooth section; and
    disposing the filter element at least partially within a casing, wherein the pocket mates with the drain without contacting the casing.

2. A method according to claim 1, further comprising substantially sealing the drain to the smooth section.

3. A method according to claim 1, further comprising substantially sealing a seal of the drain to the smooth section.

4. A method according to claim 1, further comprising substantially sealing an o-ring seal of the drain to the smooth section.

5. A method according to claim 1, wherein moving the threaded portion of the drain within the smooth section includes moving the threaded portion of the drain through a first end of the smooth section at the open end of the pocket, through a center portion of the smooth section, and through a second end of the smooth section adjacent the threaded section of the closed sidewall.

6. A method according to claim 1, further comprising supporting a center tube in engagement with an open end plate and a closed end plate, the center tube defining the central reservoir.

7. A method of assembling filter components, the method comprising:
    supporting annular filter media of a filter element around a central reservoir with an axial open end of the filter element at a first end of the central reservoir and an axial closed end of the filter element at a second end of the central reservoir, the axial open end having an opening allowing fluid to flow from the central reservoir to the outside of the filter element, and the axial closed end having a configuration preventing fluid from passing into or out of the central reservoir through the axial closed end;
    engaging a drain to a pocket of the filter element formed adjacent the axial closed end, including
        inserting a threaded portion of the drain into an open end of the pocket, wherein the open end of the pocket is formed by the axial closed end of the filter element adjacent the second end of the central reservoir, moving the threaded portion of the drain inside a closed sidewall of the pocket that extends from the open end of the pocket to a closed end of the pocket, wherein moving the threaded portion of the drain inside the closed sidewall includes moving the threaded portion of the drain through a substantially cylindrical smooth section of the closed sidewall toward the closed end of the pocket, and threading the threaded portion of the drain to a threaded section of the closed sidewall that is disposed farther from the open end of the pocket than the substantially cylindrical smooth section; and disposing the filter element at least partially within a casing, wherein the pocket mates with the drain without contacting the casing.

8. A method according to claim 7, further comprising substantially sealing the drain to the substantially cylindrical smooth section.

9. A method according to claim 7, further comprising substantially sealing a seal of the drain to the substantially cylindrical smooth section.

10. A method according to claim 7, further comprising substantially sealing an o-ring seal of the drain to the substantially cylindrical smooth section.

11. A method according to claim 7, wherein moving the threaded portion of the drain within the substantially cylindrical smooth section includes moving the threaded portion of the drain through a first end of the substantially cylindrical smooth section at the open end of the pocket, through a center portion of the substantially cylindrical smooth section, and through a second end of the substantially cylindrical smooth section adjacent the threaded section of the closed sidewall.

12. A method according to claim 7, further comprising supporting a center tube in engagement with an open end plate and a closed end plate, the center tube defining the central reservoir.

13. A method of assembling filter components, the method comprising:

supporting annular filter media of a filter element around a central reservoir with an axial open end of the filter element at a first end of the central reservoir and an axial closed end of the filter element at a second end of the central reservoir, the axial open end having an opening allowing fluid to flow from the central reservoir to the outside of the filter element, and the axial closed end having a configuration preventing fluid from passing into or out of the central reservoir through the axial closed end;

engaging a drain to a pocket of the filter element formed adjacent the axial closed end, including inserting a threaded portion of the drain into an open end of the pocket, wherein the open end of the pocket is formed by the axial closed end of the filter element adjacent the second end of the central reservoir, moving the threaded portion of the drain inside a closed sidewall of the pocket that extends from the open end of the pocket to a closed end of the pocket, wherein moving the threaded portion of the drain inside the closed sidewall includes moving the threaded portion of the drain within a smooth section of the closed sidewall that extends from the open end of the pocket to a threaded section of the closed sidewall, threading the threaded portion of the drain to the threaded section of the closed sidewall, and substantially sealing the drain to the smooth section of the closed sidewall; and disposing the filter element at least partially within a casing, wherein the pocket mates with the drain without contacting the casing.

14. A method according to claim 13, wherein substantially sealing the drain to the smooth section of the closed sidewall includes engaging a seal of the drain to the smooth section.

15. A method according to claim 13, wherein substantially sealing the drain to the smooth section of the closed sidewall includes engaging an o-ring seal of the drain to the smooth section.

16. A method according to claim 13, further comprising supporting a center tube in engagement with an open end plate and a closed end plate, the center tube defining the central reservoir.

17. A method according to claim 1, wherein the smooth section of the closed sidewall is disposed between the open end of the pocket at the second end of the central reservoir and the threaded section.

18. A method according to claim 1, wherein the pocket terminates at the axial closed end of the filter element.

19. A method according to claim 1, wherein the open end of the pocket is formed by the axial closed end of the filter element at the second end of the central reservoir.

* * * * *

UNITED STATES PATENT AND TRADEMARK OFFICE
CERTIFICATE OF CORRECTION

| | | |
|---|---|---|
| PATENT NO. | : 8,535,529 B2 | Page 1 of 1 |
| APPLICATION NO. | : 13/235332 | |
| DATED | : September 17, 2013 | |
| INVENTOR(S) | : Allott et al. | |

It is certified that error appears in the above-identified patent and that said Letters Patent is hereby corrected as shown below:

In the Specification,

Column 7, line 54, delete "Industrial Applicability" and insert -- INDUSTRIAL APPLICABILITY --.

In the Claims,

Column 9, line 3, in Claim 7, delete "dosed end" and insert -- closed end --.

Column 9, line 8, in Claim 7, delete "dosed sidewall" and insert -- closed sidewall --.

Column 9, line 8, in Claim 7, delete "dosed end" and insert -- closed end --.

Column 10, line 20, in Claim 13, delete "dosed sidewall," and insert -- closed sidewall, --.

Column 10, line 22, in Claim 13, delete "dosed sidewall;" and insert -- closed sidewall; --.

Signed and Sealed this
Twenty-fifth Day of August, 2015

Michelle K. Lee
*Director of the United States Patent and Trademark Office*